US012187030B2

(12) United States Patent
Custer et al.

(10) Patent No.: US 12,187,030 B2
(45) **Date of Patent: *Jan. 7, 2025**

(54) PRINTER ADAPTERS FOR HOLDING FANFOLDS OF MEDIA AND SYSTEMS AND METHODS THEREOF

(71) Applicant: ICERTIFY LLC, Northbrook, IL (US)

(72) Inventors: Christian Custer, Oak Grove, MN (US); Patrick Anderson, Maple Grove, MN (US); Todd Gagerman, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,239

(22) Filed: Mar. 23, 2023

(65) Prior Publication Data

US 2023/0226833 A1 Jul. 20, 2023

Related U.S. Application Data

(63) Continuation of application No. 17/510,663, filed on Oct. 26, 2021, now Pat. No. 11,642,900.

(51) Int. Cl.

| | |
|---|---|
| ***B41J 15/04*** | (2006.01) |
| ***B41J 3/36*** | (2006.01) |
| ***B41J 3/407*** | (2006.01) |
| ***B41J 3/44*** | (2006.01) |
| ***B41J 11/58*** | (2006.01) |

(52) U.S. Cl.

CPC ............... *B41J 15/042* (2013.01); *B41J 3/36* (2013.01); *B41J 3/4075* (2013.01); *B41J 3/44* (2013.01); *B41J 11/58* (2013.01)

(58) Field of Classification Search

None

See application file for complete search history.

(56) References Cited

U.S. PATENT DOCUMENTS

| | | | | |
|---|---|---|---|---|
| 8,317,188 | B1 * | 11/2012 | Lin .......................... | B65H 1/06 271/145 |
| 8,500,351 | B2 | 8/2013 | Colonel et al. | |
| 9,895,917 | B2 | 2/2018 | Corvese et al. | |
| 2011/0129281 | A1 | 6/2011 | Kumazaki | |

FOREIGN PATENT DOCUMENTS

| | | | | |
|---|---|---|---|---|
| EP | 1895479 A2 * | 3/2008 | ............. | B41J 11/58 |

OTHER PUBLICATIONS http://certexco.com/products/money-order-dispensers.

* cited by examiner

*Primary Examiner* — Matthew G Marini
(74) *Attorney, Agent, or Firm* — Edlavitch Law PLLC

(57) ABSTRACT

Described herein are novel printer adapters and systems and methods thereof that include techniques and structures for converting a desktop or compact printer configured to print onto rolls of media into a desktop or compact printer configured to print onto fanfolds of media. In other words, described herein are novel printer adapters and systems and methods thereof for converting a roll printer to a fanfold printer.

20 Claims, 7 Drawing Sheets

PRINTER ADAPTERS FOR HOLDING FANFOLDS OF MEDIA AND SYSTEMS AND METHODS THEREOF

CROSS-REFERENCE TO RELATED APPLICATIONS

The present application is a continuation application of U.S. patent application Ser. No. 17/510,663, filed Oct. 26, 2021, and entitled "PRINTER ADAPTERS FOR HOLDING FANFOLDS OF MEDIA AND SYSTEMS AND METHODS THEREOF", the entire disclosure of which application is hereby incorporated herein by reference.

TECHNICAL FIELD

The present disclosure relates to printer adapters and printers that print onto fanfolds of media as well as systems and methods utilizing printer adapters and printers that print onto fanfolds of media.

BACKGROUND

Businesses, groups and organizations use compact and desktop printers to print onto media, such as stock media. Stock media can include blank paper, cardboard, or blank stickers as well as paper, cardboard or stickers that include markings (such as templated media or media marked with serial numbers).

For some printers, the stock media can be arranged as a roll of media or fanfold of media. A continuous feed printer is a type of printer configured to print onto a roll of media or a fanfold of media. A roll of media can include individual media units combined at corresponding edges thereof and can be unrolled by a printer to be printed onto and outputted by the printer. A fanfold of media can include individual media units combined at corresponding edges thereof and is folded like a fan lengthwise at the corresponding edges. A fanfold of media can be unfolded by a printer to be printed onto and outputted by the printer.

Businesses, groups and organizations can utilize compact or desktop continuous feed printers, using rolls or fanfolds of media, to print out negotiable instruments (such as checks and money orders), labels, receipts, tags (such as shelf tags or name tags), tickets, ticket stubs, stickers (such as price stickers), and the like. Because of the wide use of such printers, there is always a need to improve upon the technology.

SUMMARY

Described herein are novel printer adapters and systems and methods thereof that include technologies for converting a desktop or compact printer configured to print onto rolls of media to a desktop or compact printer configured to print onto fanfolds of media. Also, with the novel features described herein, media within a roll printer can be locked and secured within the printer and the printer can be fastened to the countertop and converted to hold fanfolds of media within a footprint almost as small as the footprint of the printer itself.

In some embodiments, the novel printer adapters and systems and methods thereof include a lid configured to fit onto a roll printer when the adapter is fitted onto the roll printer and has converted the roll printer into a fanfold printer. And, the lid is configured to cover adapter when the adapter is fitted onto the printer.

In some embodiments, the novel printer adapters and systems and methods thereof include a locking mechanism configured to lock the lid to the printer when the lid is fitted onto the printer. The locking mechanism is also configured to secure the adapter from manual tampering of the adapter or manual tampering of the fanfold being held by the adapter when the adapter is fitted onto the printer and the lid is locked onto the printer.

In some embodiments, the novel printer adapters and systems and methods thereof include a mount to attach the printer to a surface, such as a top surface of a counter, a table or a desk. In some embodiments, the locking mechanism is also configured to lock, via the mount, the printer to the surface. In such examples, the locking mechanism is also configured to secure the printer to the surface via the mount in addition to preventing manual tampering of the adapter or manual tampering of the fanfold being held by the adapter when the adapter is fitted onto the printer and the lid is locked onto the printer.

These and other important aspects of the invention are described more fully in the detailed description below. The invention is not limited to the particular assemblies, apparatuses, methods and systems described herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various embodiments of the disclosure.

In FIG. 2, the lid is shown as partially transparent so that the adapter that converts the printer from a roll printer to a fanfold printer is shown.

In FIG. 3, the backside of the system is shown.

DETAILED DESCRIPTION OF EXAMPLE EMBODIMENTS

Details of example embodiments of the invention are described in the following detailed description with reference to the drawings. Although the detailed description provides reference to example embodiments, it is to be understood that the invention disclosed herein is not limited to such example embodiments. But to the contrary, the invention disclosed herein includes numerous alternatives, modifications and equivalents as will become apparent from consideration of the following detailed description and other parts of this disclosure.

Described herein are novel printer adapters and systems and methods thereof that include techniques and structures for converting a desktop or compact printer configured to print onto rolls of media into a desktop or compact printer configured to print onto fanfolds of media. In other words, described herein are novel printer adapters and systems and methods thereof for converting a roll printer to a fanfold printer.

Figure 1:
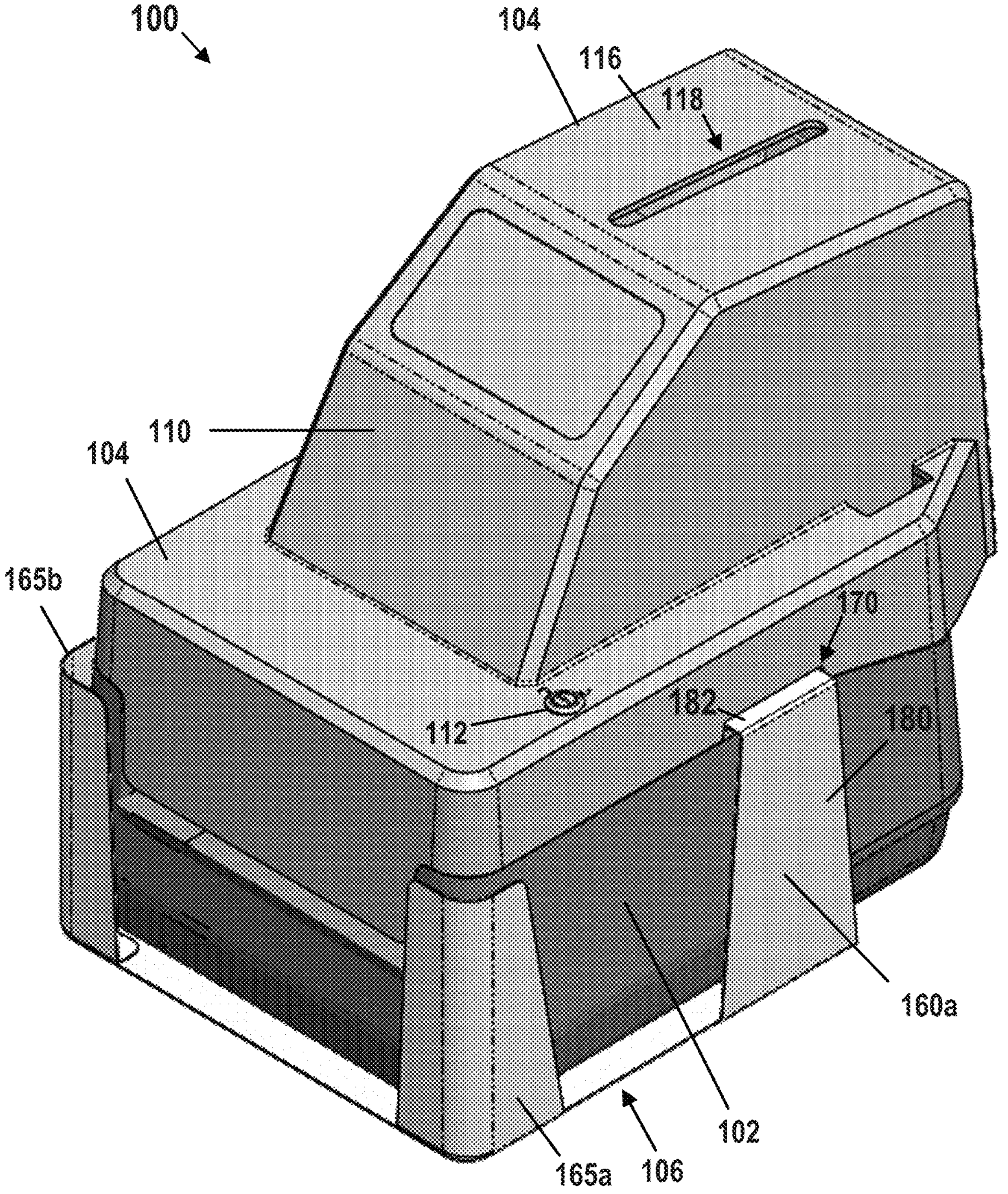
FIG. 1 illustrates a front perspective view of a system including a roller-based continuous feed printer converted to a fanfold-based continuous feed printer with a lid and a mount attached to the printer, in accordance with some embodiments of the present disclosure.
Figure 2:
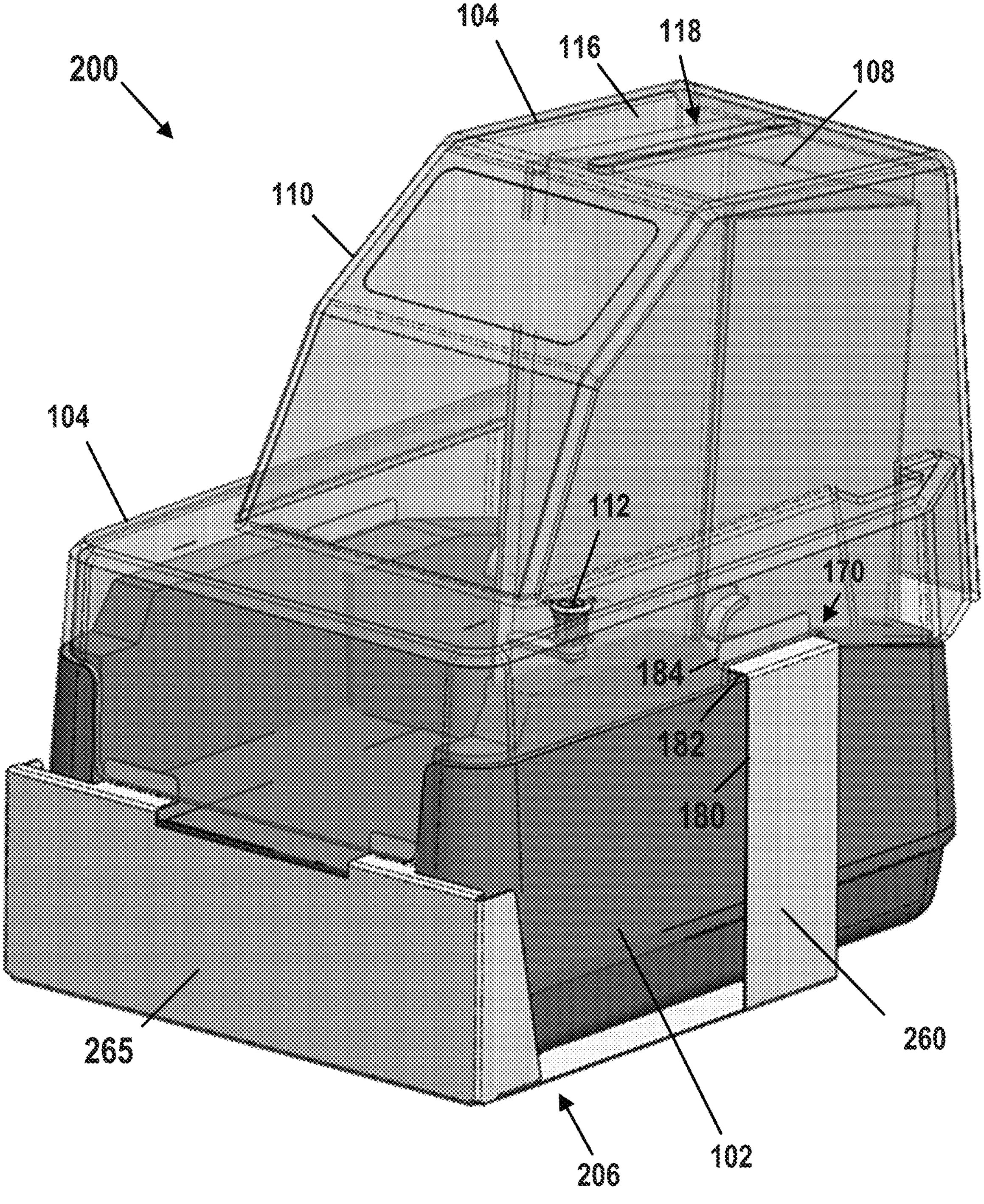
FIG. 2 illustrates a front perspective view of a system including the printer shown in FIG. 1 and the lid shown in FIG. 1 and including another example mount attached to the printer, in accordance with some embodiments of the present disclosure.
Figure 3:
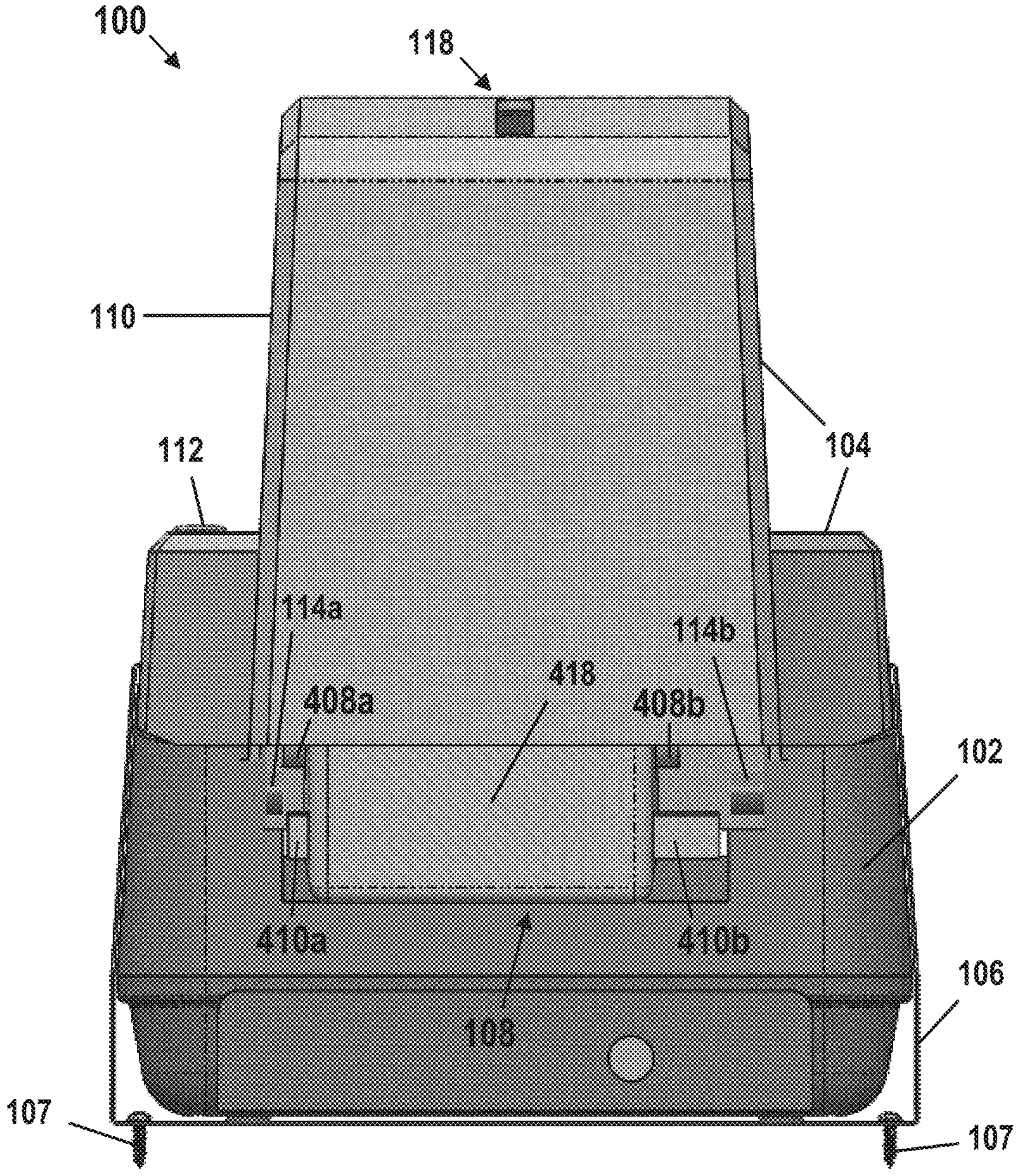
FIG. 3 illustrates back perspective view of the system shown in FIG. 1, in accordance with some embodiments of the present disclosure.
Figure 5:
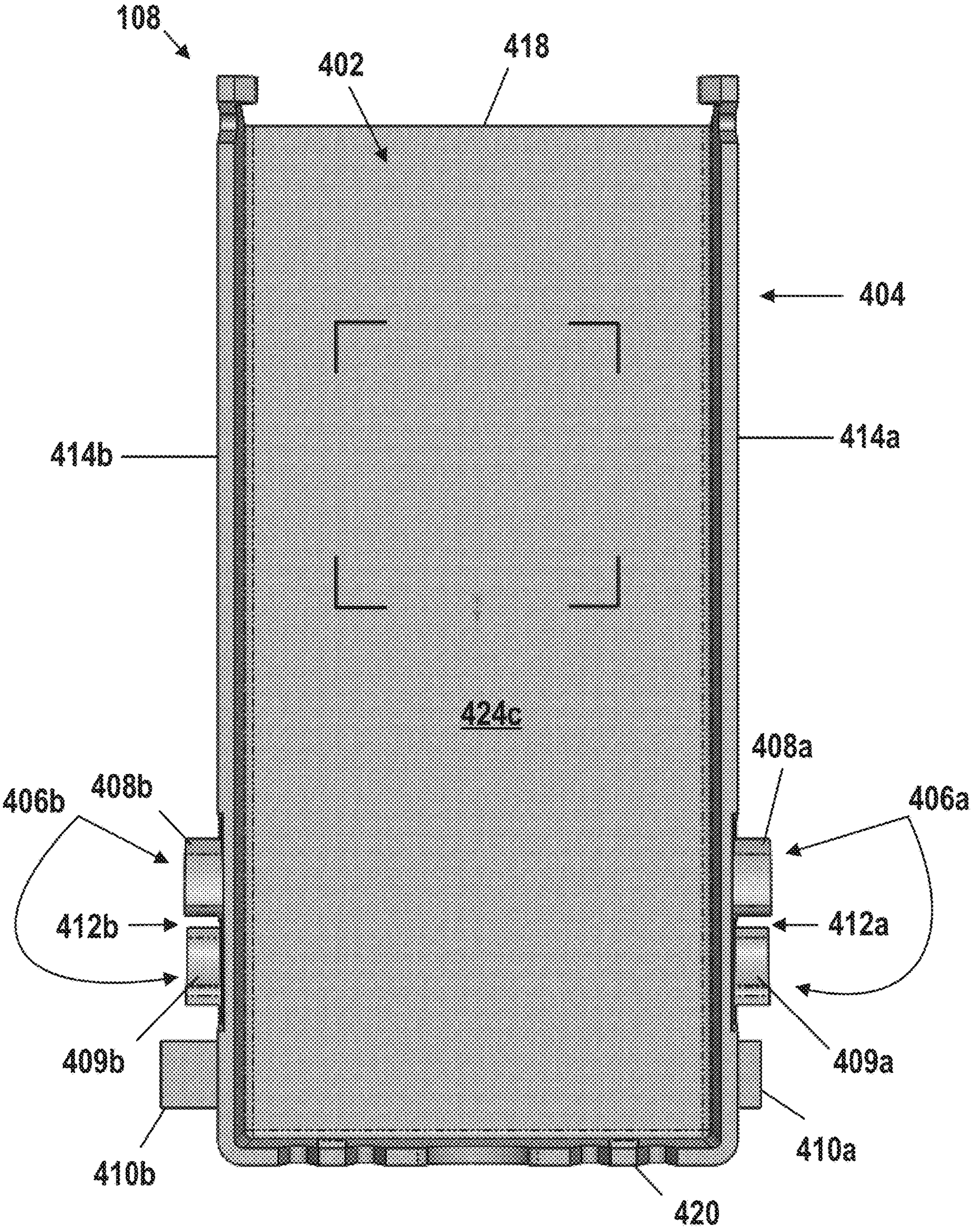
FIG. 5, illustrates another front perspective view of the adapter shown in FIG. 2, in accordance with some embodiments of the present disclosure.
Figure 6:
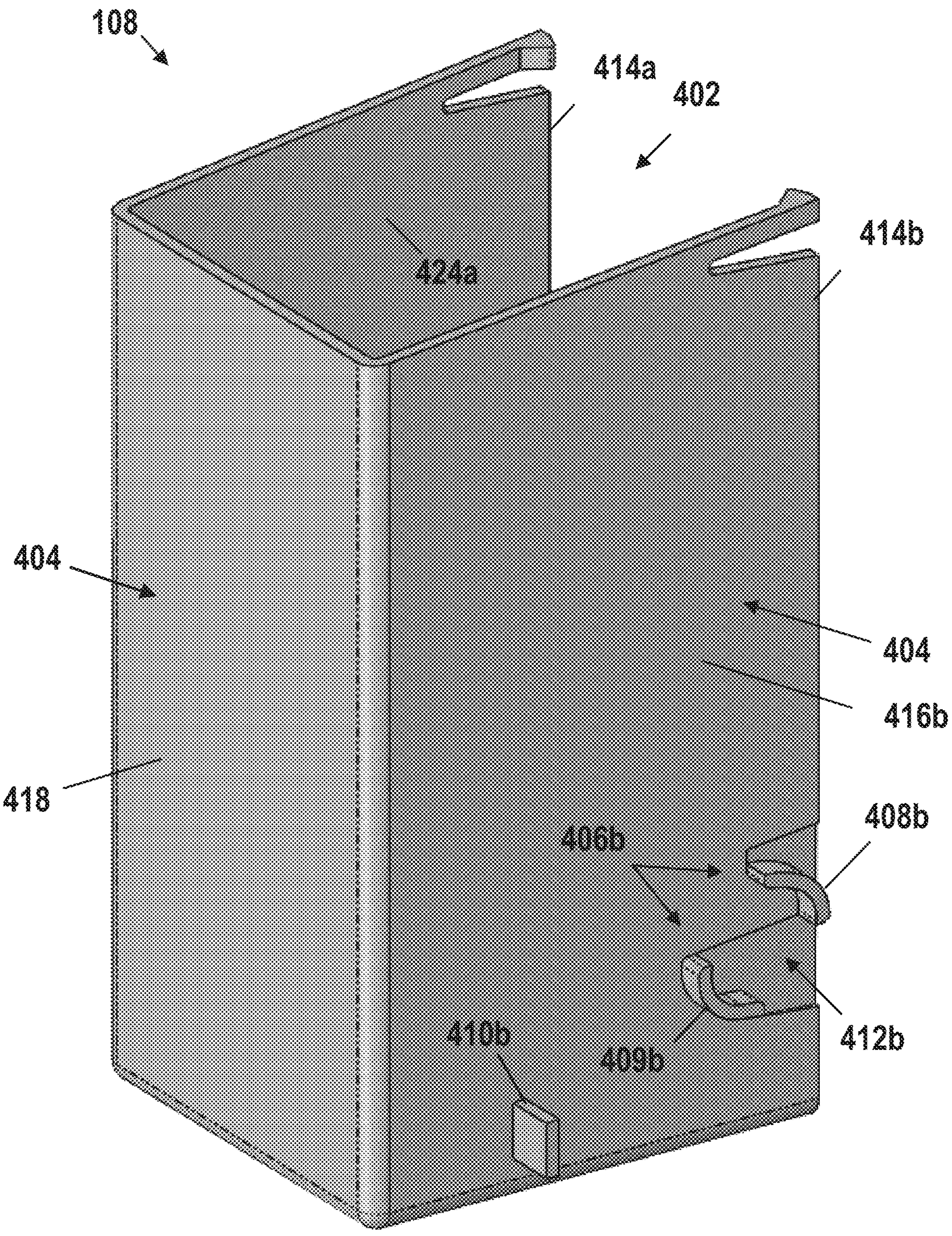
FIG. 6, illustrates a back perspective view of the adapter shown in FIG. 2, in accordance with some embodiments of the present disclosure.
Figure 7:
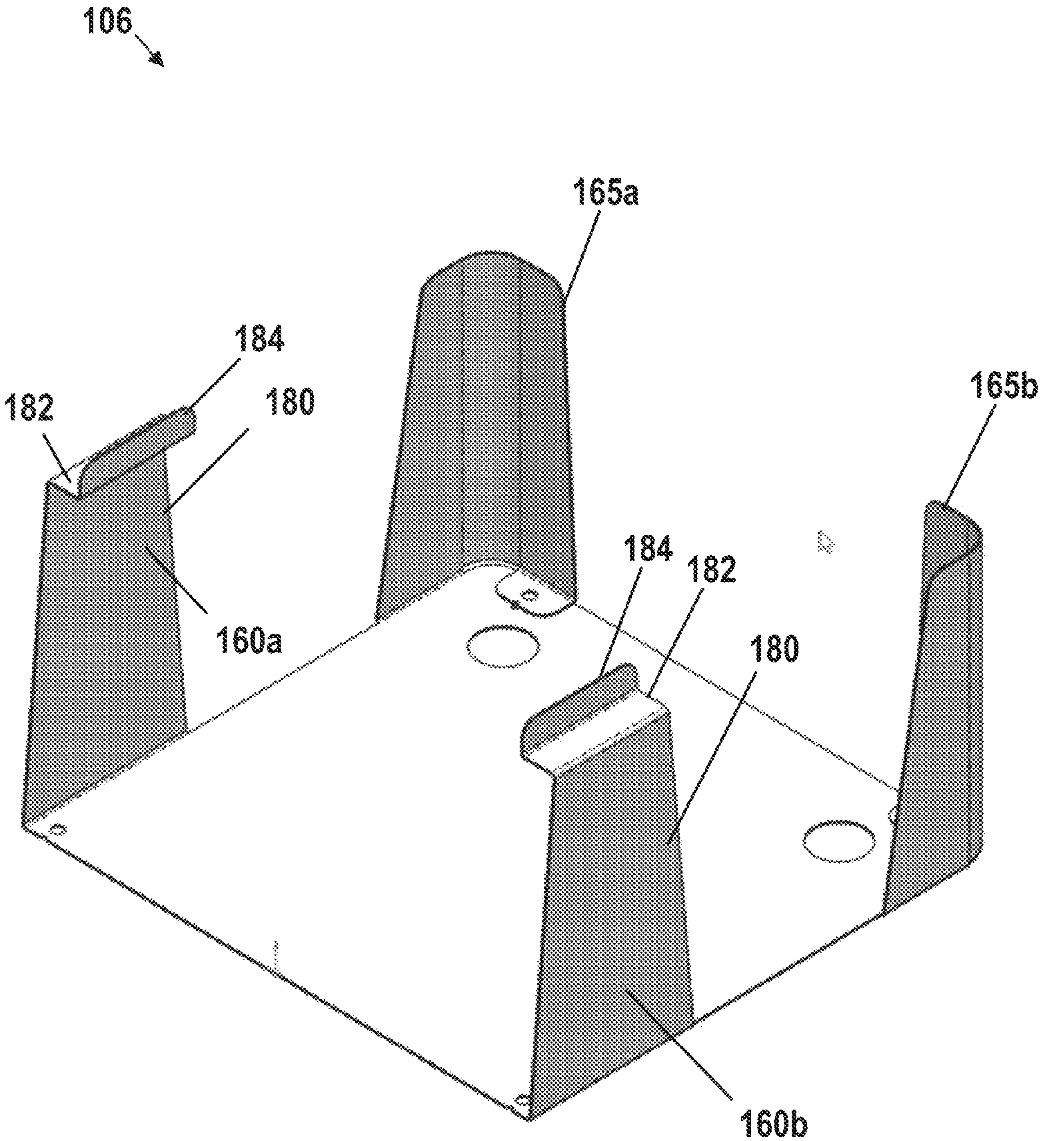
FIG. 7, illustrates a back perspective view of the mount shown in FIG. 1, in accordance with some embodiments of the present disclosure.

For example, FIGS. 1 and 2 show front perspective views of systems 100 and 200, respectively, each including a roller-based continuous feed printer converted to a fanfold-based continuous feed printer, in accordance with some embodiments of the present disclosure. Specifically, each of the systems 100 and 200 include a continuous feed printer 102, a lid 104 and a respective bracket mount attached to the continuous feed printer (e.g., see bracket mounts 106 and 206). In FIGS. 1, 3, and 7, a bracket mount 106 is depicted. Also, in FIG. 3, screws 107 are shown, which can be inserted or screwed in through respective holes of the bracket mount 106 to screw into a surface (such as a top surface) of a piece of furniture (such as a table, counter, or desk). In FIG. 2, the bracket mount 206 is depicted and the lid 104 is shown as partially transparent so that an adapter 108 that converts the continuous feed printer 102 from a roll printer to a fanfold printer is shown. Also, see FIGS. 4, 5, and 6 for perspective views of the adapter 108 that converts a continuous feed printer 102 from a roll printer to a fanfold printer. FIG. 3 also shows the backside of the system 100 as well as the backside of the continuous feed printer 102, the backside of the lid 104, and the backside of the adapter 108.

In some embodiments, a lid (such as lid 104) is designed to increase security and accommodate a small footprint. In some examples of the lid, features include: a raised lid to accommodate holding blank stock inside the printer (e.g., see the raised portion 110 of the lid 104 shown in FIGS. 1, 2, and 3), a locking mechanism (e.g., see a part of a locking mechanism 112 shown in FIGS. 1, 2, and 3) to ensure the inside of the printer cannot be accessed without a key.

In some embodiments, a magazine or an adapter (such as adapter 108 shown in FIGS. 1 to 6) is designed to hold stock media (such as fanfold stock media) inside the printer. The magazine or the adapter allows the stock media to be locked inside the printer and accommodates fanfold stock media when the printer is designed originally for roll stock media.

For purposes of the description herein, it is to be understood that media or stock media described herein can be any type of media or stock media, respectively, unless specified otherwise. It is also to be understood that the media or stock media described herein can be arranged as a roll of media or a fanfold of media (also known as roll media and fanfold media). Media and stock media described herein can include paper, cardboard, stickers, plastics-based media, and the like. The media and stock media described herein can include blank media as well as media that includes markings (such as templated media or media marked with serial numbers). It is also to be understood that a roll of media can include individual media units combined at corresponding edges thereof and can be unrolled by a continuous feed printer to be printed onto and outputted by the printer. A fanfold of media can include individual media units combined at corresponding edges thereof and is folded like a fan lengthwise at the corresponding edges. A fanfold of media can be unfolded by a continuous feed printer to be printed onto and outputted by the printer.

For purposes of the description herein, it is to be understood that a continuous feed printer, which can be part of some embodiments described herein, is a type of printer configured to print onto a roll of media or a fanfold of media. It is also to be understood that the output of the printer can include negotiable instruments (such as checks, certified checks, and money orders), labels, receipts, tags (such as shelf tags or name tags), tickets, ticket stubs, stickers (such as price stickers), and the like. And, it is to be understood that the adapter and the printer or a system or method thereof can be configured to accommodate negotiable instruments (such as checks, certified checks, and money orders), labels, receipts, tags (such as shelf tags or name tags), tickets, ticket stubs, stickers (such as price stickers), and the like.

In some embodiments, a mount, e.g., a bracket mount (such as the bracket mounts 106 and 206), is designed to secure the entire printer assembly to a piece of furniture (such as a table, a counter, or a desk). The mount (e.g., bracket mount) completes the security aspects of the printer to ensure the printer or stock media cannot easily be stolen, in some implementations. The locking mechanism can include combined locking of the lid and the mount to the printer, which can secure the stock media within the casing formed by the printer and the lid.

In some embodiments, the printer and the system, including the adapter, can be used to print money orders or other types of negotiable instruments and other fan folded media such as fanfolds of paper or cardboard stock for tickets. The systems, methods, and apparatuses described herein allow a fanfold of blank media (or media with markings) to be held inside the printer in place of the typical roll stock media. The systems, methods, and apparatuses described herein can also allow the printer to be locked and fastened to the countertop or desk in order to provide more security for organizations using the printer.

In some embodiments, the magazine or adapter is designed to fit into roll stock holding arms. This allows the printer to hold fan-folded media inside the printer. The magazine or adapter is designed to be able to reload media without having to remove the magazine or adapter from a locked location in the printer, in some embodiments.

Embodiments described herein can be lockable. For instance, embodiments can include a keyed lock to the printer via the lid. And, in some examples, embodiments can include a keyed lock to the printer via the lid and the mount. This is beneficial in that media in the printer can be stored securely. Also, in such embodiments and others a secure casing or the mount as well as the entire assembly of the printer, the lid, and adapter can have a small footprint (such as a footprint that is slightly beyond the width of the printer originally before it is combined with the other parts to form the assembly). Some example embodiments can use a roll stock bracket to hold a magazine that holds fan folded media, such that the media resides in cavity formed by the lid and printer. Also, in some examples, an embodiment can have an anti-theft mounting bracket to prevent theft of the printer. Such mounts can include arms that block a feed button or an output button of the printer. This can prevent a user from manually outputting media stored within the casing of the printer and lid combination by pressing an output button or a feed button that may have a reverse feed function.

Referring back to the embodiments in the figures and other possible embodiments, some examples include an apparatus (such as the adapter 108) that includes an inner portion (such as inner portion 402 shown in FIGS. 4, 5, 6) configured to receive and hold a fanfold of media. The apparatus also includes an outer portion (such as outer portion 404 shown in FIGS. 4, 5, 6) configured to be received and held by a roll printer (such as the printer 102). Originally, the roll printer is configured to print onto a roll of media. The roll printer includes a first support member and a second support member configured to support the roll of media held therebetween. For example, the printer 102 includes a first support member 114*a* and a second support member 114*b* configured to support the roll of media held therebetween. The outer portion of the apparatus includes a first receiving member and second receiving member, configured to fit onto the first and second support members of the roll printer respectively. For example, the outer portion 404 of the adapter 108 includes a first receiving member 406*a* and second receiving member 406*b*, configured to fit onto the first support member 114*a* and the second support member 114*b* of the printer 102, respectively. Also, depicted in FIGS. 4, 5, and 6, the first receiving member 406*a* has a top part 408*a* and a bottom part 409*a* which eases manual insertion of a first support member 114*a* of the printer into a cavity 412*a* formed by the top and bottom part of the first receiving member. Likewise, the second the second receiving member 406*b* has a top part 408*b* and a bottom part 409*b* which eases manual insertion of a second support member 114*b* of the printer into a cavity 412*b* formed by the top and bottom part of the second receiving member. Also, depicted in FIGS. 4, 5, and 6, a first lower support member 410*a* and a second lower support member 410*b* on the outer portion 404 of the adapter 108, which further support the adapter when it is inserted onto the printer 102. The lower support members 410*a* and 410*b* are below and behind the first and second receiving members 406*a* and 406*b*, respectively.

Also, in such examples, such as the embodiments depicted in figures, the roll printer (e.g., printer 102) is configured to print onto the fanfold of media instead of the roll of media (which is held by the apparatus, such as adapter 108) when the inner portion of the apparatus (e.g., inner portion 402) is holding the fanfold and the first and second receiving members (e.g., first and second receiving members 406*a* and 406*b*) are fitted onto the first and second support members (e.g., first and second support members 114*a* and 114*b*). FIG. 3 partially shows how the first and second receiving members 406*a* and 406*b* of the adapter 108 are fitted onto the first and second support members 114*a* and 114*b* of the printer 102, since, in FIG. 3, only the top parts 480*a* and 408*b* of the first and second receiving members 406*a* and 406*b* are depicted and portions of the first and second support members 114*a* and 114*b* are not depicted (which are portions of the support members of the printer that are inserted into the respective cavities formed by the top and bottom parts of the receiving members of the adapter).

Figure 4:
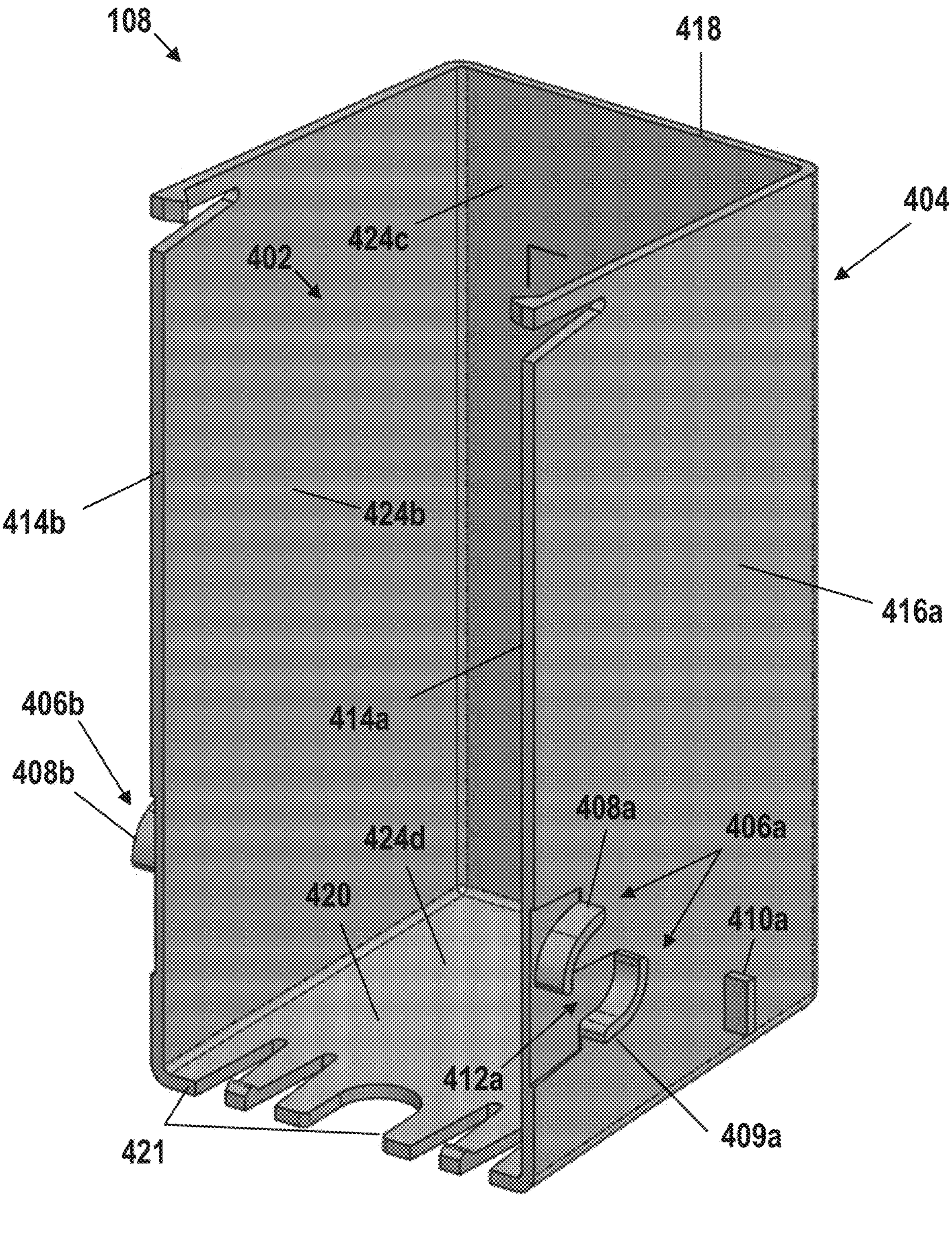
FIG. 4, illustrates a front perspective view of the adapter shown in FIG. 2, in accordance with some embodiments of the present disclosure.

In such example embodiments, the apparatus can further include a first side wall including an outer portion that includes the first receiving member. For instance, the adapter 108 can include a first side wall 414*a* including an outer portion 416*a* that includes the first receiving member 406*a*. Also, the apparatus can further include a second side wall including an outer portion that includes the second receiving member. For instance, the adapter 108 can include a second side wall 414*b* including an outer portion 416*b* that includes the second receiving member 406*b*. Also, the apparatus can include a back wall and a floor. For example, the adapter 108 can include a back wall 418 and a floor 420. As shown in FIG. 4, the floor 420 includes teeth 421 that are configured to interface a part of the fanfold of media to attach the fanfold to the adapter 108. Also, like the apparatus as a whole, the first and second side walls, the back wall, and the floor include respective inner portions. This in shown in the figures as well. For instance, the first and second side walls 414*a* and 414*b*, the back wall 418, and the floor 420 include respective inner portions (e.g., see inner portions 424*a*, 424*b*, and 424*c*, 424*d*). In such examples, the respective inner portions form the inner portion of the apparatus configured to receive and hold the fanfold of media as well as form an opening of the apparatus to receive the fanfold of media. For example, the inner portions 424*a*, 424*b*, and 424*c*, 424*d* form the inner portion 402 of the adapter 108 configured to receive and hold the fanfold of media as well as form an opening of the adapter to receive the fanfold of media.

In such example embodiments, the apparatus can further include a lid configured to fit onto the roll printer when the apparatus is fitted onto the roll printer and configured to cover the opening of the apparatus when the apparatus is fitted onto the roll printer. For instance, the adapter 108 is further used with the lid 104 that is configured to fit onto the printer 102 when the adapter 108 is fitted onto the printer and configured to cover the opening of the adapter when the adapter is fitted onto the printer.

In such example embodiments, the apparatus can further include a locking mechanism configured to lock the lid to the roll printer when the lid is fitted onto the roll printer and configured to secure the apparatus from manual tampering of the apparatus or manual tampering of the fanfold being held by the apparatus when the apparatus is fitted onto the roll printer and the lid is locked onto the roll printer. For instance, the adapter 108 further be used with a locking mechanism (e.g., see the part of the locking mechanism 112) configured to lock the lid 104 to the printer 102 when the lid is fitted onto the printer and configured to secure the adapter 108 from manual tampering of the adapter or manual tampering of the fanfold being held by the adapter when the adapter is fitted onto the printer and the lid is locked onto the printer.

In some embodiments, a top portion of the lid includes a slit that is configured to provide a view of the inner portion of the apparatus or a fanfold being held by the inner portion of the apparatus. For instance, as illustrated by FIG. 2, a top portion 116 of the raised portion 110 of the lid 104 includes a slit 118 that is configured to provide a view of the inner portion 402 of the of the adapter 108 or a fanfold being held by the inner portion of the adapter.

In some example embodiments (such as the ones mentioned above), the apparatus can further include a mount that includes a first side support member and a second side support member. The mount is configured to support the roll printer held between the first and second side support members and configured to attach to a surface to mount the roll printer to the surface. The surface can be a top surface of a piece of furniture (such as a top surface of a table, a counter, or a desk). As shown in the FIGS. 1, 2, and 7, the adapter is further used with the mount 106 or the mount 206. Mount 106 includes a first side support member 160*a* and a second side support member 160*b*. The mount 106 is configured to support the printer 102 held between the first and second side support members 160*a* and 160*b* and configured to attach to a surface to mount the printer 102 to the surface. Mount 206 includes a first side support member 260 and a second side support member (not depicted). The mount 206 is configured to support the printer 102 held between the first and second side support members 260*a* and 260*b* and configured to attach to a surface to mount the printer 102 to the surface.

In some example embodiments (such as the ones mentioned above), the lid includes first and second side receiving portions configured to fit over the first and second side support members of the mount respectively when the lid is fitted onto the roll printer. For instance, FIGS. 1 and 2 show a receiving portion 170 of two receiving portions of the lid 104, in which the receiving portion 170 is configured to fit over the first side support member of a mount (e.g., see first side support members 160*a* and 260) when the lid is fitted onto the printer. Also shown, each one of the first side support members 160*a* and 260 as well as the second side support members (e.g., see second side support member 160*b*) includes a main portion 180 adjacent to a short horizontal extension 182 that is between a short vertical extension 184 and the main portion 180. The short horizontal extension 182 and the short vertical extension 184 is surrounded by a receiving portion of the lid 104 (e.g., see receiving portion 170) and an adjacent portion of the printer 102 when the lid is fitted onto the printer, and the aforesaid combination of parts supports the attachment of the mount 106 or the mount 206 to the printer. The locking mechanism (e.g., see the part of a locking mechanism 112) is configured to lock the attachment of the mount 106 or the mount 206 to the printer 102 after the extensions of the support members of either mount have been received by the receiving portions of the lid 104.

In some example embodiments (such as the ones mentioned above), the mount includes a front support member that is configured to further support the roll printer such that printer is held between the first and second side support members and the front support member. For instance, FIGS. 1 and 7 show the mount 106 including front support members 165*a* and 165*b* that are each configured to further support the printer 102 such that printer is held between the first and second side support members 160*a* and 160*b* and the front support members 165*a* and 165*b*. Also, for example, FIG. 2 shows the mount 206 including a front support member 265 that is configured to further support the printer 102 such that printer is held between the first and second side support members (e.g., see the side support member 260) and the front support member 265. Such front support members can be configured to block access to a feed button or an output button of the printer to prevent manual outputting of stock media from the printer and lid assembly. In embodiments arranged for money orders, this, for example, can prevent a person from stealing blank money orders from pressing a feed or output button on the printer.

In some embodiments, for example, the inner portion of the apparatus is configured to receive and hold a fanfold of partially printed negotiable instruments, and the roll printer is configured to print onto the fanfold of partially printed negotiable instruments. In some embodiments, for example, the inner portion of the apparatus is configured to receive and hold a fanfold of partially printed tickets, and the roll printer is configured to print onto the fanfold of partially printed tickets.

In some embodiments, a system includes a roll printer (e.g., see printer 102), configured to print onto a roll of media as well as first and second support members of the roll printer, configured to support the roll of media held between the first and second support members. Such a system also includes a holder (e.g., see adapter 108), configured to hold a fanfold of media, and including first and second receiving members that are configured to fit onto the first and second support members, respectively. In such embodiments, the roll printer is configured to print onto the fanfold of media instead of the roll of media when the holder is holding the fanfold and the first and second receiving members are fitted onto the first and second support members. In some embodiments, the holder is manually insertable into the roll printer. In some embodiments, the holder includes an inner portion configured to receive and hold the fanfold of media as well as an outer portion including the first and second support members. In some embodiments, the holder includes a first side wall including an outer portion that includes the first receiving member as well as a second side wall including an outer portion that includes the second receiving member. The holder also includes a back wall and a floor. The first and second side walls, the back wall, and the floor include respective inner portions. And, the respective inner portions form the inner portion of the holder configured to receive and hold the fanfold of media as well as form an opening of the holder to receive the fanfold of media. In some embodiments, the system includes a lid configured to fit onto the roll printer when the holder is fitted onto the roll printer and configured to cover the opening of the holder when the holder is fitted onto the roll printer. In some embodiments, the system includes a locking mechanism configured to lock the lid to the roll printer when the lid is fitted onto the roll printer as well as secure the holder from manual tampering of the holder or manual tampering of the fanfold being held by the holder when the holder is fitted onto the roll printer and the lid is locked onto the roll printer. In some embodiments, a top portion of the lid includes a slit that is configured to provide a view of the inner portion of the holder or the fanfold being held by the inner portion of the holder. In some embodiments, the system includes a mount, including first and second side support members, and configured to support the roll printer held between the first and second side support members as well as attach to a surface to mount the roll printer to the surface. The lid includes first and second side receiving portions configured to fit over the first and second side support members of the mount respectively when the lid is fitted onto the roll printer. In some embodiments, the mount includes a front support member that is configured to further support the roll printer such that printer is held between the first and second side support members and the front support member.

In some embodiments, a system includes a roll printer (e.g., see printer 102), configured to print onto a roll of partially printed negotiable instruments, as well as first and second support members of the roll printer, configured to support the roll of partially printed negotiable instruments held between the first and second support members. Such embodiments of the system also include a holder (e.g., see adapter 108), configured to hold a fanfold of partially printed negotiable instruments, and including first and second receiving members that are configured to fit onto the first and second support members, respectively. The roll printer is configured to print onto the fanfold of partially printed negotiable instruments instead of the roll of partially printed negotiable instruments when the holder is holding the fanfold and the first and second receiving members are fitted onto the first and second support members.

While the invention has been described in conjunction with the specific embodiments described herein, it is evident that many alternatives, combinations, modifications and variations are apparent to those skilled in the art. Accordingly, the example embodiments of the invention, as set forth herein are intended to be illustrative only, and not in a limiting sense. Various changes can be made without departing from the spirit and scope of the invention.

What is claimed is:

1. An apparatus, comprising:

an inner portion of an adapter, configured to receive and hold a fanfold of media; and an outer portion of the adapter, configured to be received by a roll stock bracket of a roll printer and comprising a pair of receiving members, each member of the pair of receiving members comprises a top part and a bottom part to ease manual insertion of the roll stock bracket into a cavity formed by the top part and the bottom part, wherein the top part comprises a structure corresponding to a part of the structure of the roll stock bracket.

2. The apparatus of claim 1, comprising a lid and a locking mechanism configured to lock the lid to the roll printer when the lid is fitted onto the roll printer, wherein the locking mechanism is configured to secure the apparatus from manual tampering of the apparatus or manual tampering of the fanfold being held by the apparatus when the apparatus is fitted onto the roll printer and the lid is locked onto the roll printer.

3. The apparatus of claim 2, wherein the lid is configured to fit onto the roll printer when the apparatus is fitted onto the roll printer.

4. The apparatus of claim 3, wherein the lid is configured to cover an opening of the apparatus when the apparatus is fitted onto the roll printer.

5. The apparatus of claim 2, wherein a top portion of the lid comprises a slit that is configured to provide a view of the inner portion of the apparatus or the fanfold being held by the inner portion of the apparatus.

6. The apparatus of claim 1, wherein the roll printer comprises first and second support members configured to support a roll of media held therebetween, and wherein the outer portion of the apparatus comprises first and second receiving members, configured to fit onto the first and second support members of the roll printer respectively.

7. The apparatus of claim 6, wherein the roll printer is configured to print onto the roll of media, and wherein the roll printer is configured to print onto the fanfold of media instead of the roll of media when the inner portion of the apparatus is holding the fanfold and the first and second receiving members are fitted onto the first and second support members.

8. The apparatus of claim 1, comprising:

a first side wall comprising an outer portion that comprises the first receiving member; and a second side wall comprising an outer portion that comprises the second receiving member.

9. The apparatus of claim 8, comprising a back wall.

10. The apparatus of claim 9, comprising a floor.

11. The apparatus of claim 10, wherein the first and second side walls, the back wall, and the floor comprise respective inner portions, and wherein the respective inner portions form the inner portion of the apparatus configured to receive and hold the fanfold of media as well as form an opening of the apparatus to receive the fanfold of media.

12. The apparatus of claim 1, wherein the inner portion of the apparatus is configured to accommodate as well as receive and hold a fanfold of partially printed negotiable instruments, and wherein the roll printer is configured to print onto the fanfold of partially printed negotiable instruments.

13. The apparatus of claim 1, wherein the inner portion of the apparatus is configured to accommodate as well as receive and hold a fanfold of partially printed tickets, and wherein the roll printer is configured to print onto the fanfold of partially printed tickets.

14. The apparatus of claim 1, wherein the bottom part comprises a structure corresponding to a part of the structure of the roll stock bracket.

15. The apparatus of claim 14, wherein the bottom part comprises a curved structure.

16. The apparatus of claim 15, wherein the curved structure comprises an arc.

17. The apparatus of claim 1, wherein the top part comprises a curved structure.

18. The apparatus of claim 17, wherein the curved structure comprises an arc.

19. An apparatus, comprising:

an inner portion of an adapter, configured to receive and hold a fanfold of media; and an outer portion of the adapter, configured to be received by a roll stock bracket of a roll printer and comprising a pair of receiving members, each member of the pair of receiving members comprises a top part and a bottom part to ease manual insertion of the roll stock bracket into a cavity formed by the top part and the bottom part, wherein the bottom part comprises a structure corresponding to a part of the structure of the roll stock bracket.

20. An apparatus, comprising:

an inner portion of an adapter, configured to receive and hold a fanfold of media; and an outer portion of the adapter, configured to be received by a roll stock bracket of a roll printer and comprising a pair of receiving members, each member of the pair of receiving members comprises a top part and a bottom part to ease manual insertion of the roll stock bracket into a cavity formed by the top part and the bottom part, wherein the bottom part comprises a structure corresponding to a first part of the structure of the roll stock bracket, and wherein the top part comprises a structure corresponding to a second part of the structure of the roll stock bracket.

* * * * *